United States Patent [19]

Oshima et al.

[11] Patent Number: 5,277,410
[45] Date of Patent: Jan. 11, 1994

[54] UPPER SUPPORT FOR SUSPENSION SYSTEM HAVING TWO OUTER RIGID MEMBERS, AND METHOD OF MANUFACTURING THE SAME

[75] Inventors: Tsukasa Oshima, Komaki; Michio Ito, Inuyama, both of Japan

[73] Assignee: Tokai Rubber Industries, Ltd., Japan

[21] Appl. No.: 71,923

[22] Filed: May 20, 1993

Related U.S. Application Data

[63] Continuation of Ser. No. 829,290, Feb. 3, 1992, abandoned.

[30] Foreign Application Priority Data

Feb. 21, 1991 [JP] Japan .................. 3-048939

[51] Int. Cl.$^5$ .................. B60G 15/04; F16F 7/10
[52] U.S. Cl. .................. 267/220; 267/140.11
[58] Field of Search .......... 267/140.11, 140.12, 267/140.13, 219, 220, 35; 248/550

[56] References Cited

U.S. PATENT DOCUMENTS

| | | | |
|---|---|---|---|
| 4,984,777 | 1/1991 | Kurr et al. | 267/140.1 A |
| 5,005,810 | 4/1991 | Sawada et al. | 267/140.1 A |
| 5,024,461 | 6/1991 | Miyakawa et al. | 267/219 |
| 5,040,775 | 8/1991 | Miyakawa | 267/220 |
| 5,064,176 | 11/1991 | Goto | 267/219 |

FOREIGN PATENT DOCUMENTS 2-114506  9/1990  Japan .

Primary Examiner—Matthew C. Graham
Attorney, Agent, or Firm—Parkhurst, Wendel & Rossi

[57] ABSTRACT

An upper support for a suspension system manufactured by preparing a first intermediate product including an inner rigid member, a first outer rigid member and a first elastic body for elastically connecting the inner and first outer rigid members. The first intermediate product is then placed within a mass of a non-compressible fluid. A second elastic body and a resonance member are then assembled with the inner and first outer rigid members, so as to prepare a second intermediate product having a fluid chamber filled with the fluid and defined between the first and second elastic bodies. The second intermediate product is then removed from the mass of the non-compressible fluid, and a second outer rigid member having an attaching portion mounted, in the atmosphere on the second intermediate product.

9 Claims, 6 Drawing Sheets

UPPER SUPPORT FOR SUSPENSION SYSTEM HAVING TWO OUTER RIGID MEMBERS, AND METHOD OF MANUFACTURING THE SAME

This is a continuation of application Ser. No. 07/829,290 filed Feb. 3, 1992, now abandoned.

BACKGROUND OF THE INVENTION

1. Field of the Invention

The present invention relates to an upper support used in a suspension system of a motor vehicle which is constructed for easy assembling with improved efficiency, and to a method of manufacturing the upper support.

2. Discussion of the Prior Art

In a conventional suspension system of a motor vehicle, a generally cylindrical upper support is interposed between the body of the vehicle, and a piston rod of a shock absorber which is linked with an axle or arm for supporting vehicle wheels. Such an upper support is adapted to prevent input vibrations received from the wheels through the shock absorber, from being transmitted to the vehicle body, for example. The upper support usually includes a cylindrical inner rigid member to which the piston rod of the shock absorber is fixed, a cylindrical outer rigid member which is disposed radially outwardly of the inner rigid member and fixed to the vehicle body, and an elastic body interposed between the inner and outer rigid members for elastically connecting the two members.

To meet a recently increasing requirement for high-grade cars having improved vibration-isolating capability, there has been proposed a fluid-filled cylindrical upper support which contains a non-compressible fluid. The assignee of the present application has proposed such a fluid-filled upper support as disclosed in laid-open Publication No. 2-114506 of unexamined Japanese Utility Model application. The upper support disclosed therein has an annular fluid chamber filled with a non-compressible fluid, which extends between the inner and outer rigid members, in the circumferential direction of the upper support. The upper support further includes an annular resonance member which is accommodated in the fluid chamber to substantially divide the chamber into two sections, and a fluid passage through which the fluid flows between the two sections upon application of a vibrational load between the inner and outer rigid members. The thus constructed upper support exhibits a sufficiently high vibration-isolating capability, based on resonance of the fluid flowing through the passage.

In the upper support of the above type, the inner and outer rigid members and the elastic body are usually prepared independently under the atmosphere and then assembled in a mass of the non-compressible fluid for filling the fluid chamber, as disclosed in the above-indicated publication. Thus, the filling of the fluid chamber with the fluid is accomplished by assembling the inner and outer rigid members and the elastic body within the fluid means.

The outer rigid member usually has an integrally formed mounting bracket in the form of an outward flange extending radially outwardly of the outer circumferential surface thereof, and its outer dimensions are inevitably increased. Therefore, it is cumbersome to handle the outer rigid member within the fluid mass, and the assembling of the conventional upper support including the outer rigid member is a difficult job for the worker.

The upper support is usually assembled such that the inner rigid member is connected with the piston rod of the shock absorber and the outer rigid member is fixed to the vehicle body. Therefore, these rigid members must be manually positioned for a predetermined circumferential or angular relationship for connection to the shock absorber and vehicle body, and this manual positioning within the fluid mass is cumbersome Thus, the assembling of the conventional upper support cannot be automated.

SUMMARY OF THE INVENTION

It is therefore a first object of the present invention to provide a fluid-filled upper support used in a suspension system of a motor vehicle, which is constructed for easy assembling within a mass of a non-compressible fluid, without having to establish a predetermined circumferential relationship between the inner and outer rigid members within the mass of the non-compressible fluid.

A second object of the present invention is to provide a method suitable for manufacturing such an upper support as described above, which method permits circumferential positioning of the outer rigid member relative to the inner rigid member, outside the mass of the non-compressible fluid, thereby facilitating the assembling of the upper support, even where the outer rigid member is large-sized.

The first object may be attained according to the principle of the present invention, which provides an upper support used for a suspension system of a motor vehicle, which is interposed between a body of a vehicle and a shock absorber of the vehicle for elastically connecting the vehicle body and the shock absorber, comprising (a) a generally cylindrical inner rigid member having a center bore into which a piston rod of the shock absorber is inserted, (b) a generally cylindrical first outer rigid member which is disposed radially outwardly of the inner rigid member with a predetermined radial spacing therebetween, (c) an annular first elastic body which is interposed between the inner and first outer rigid members at one of axially opposite ends of the upper support, for elastically connecting the inner and first outer rigid members, (d) an annular second elastic body having a cylindrical inner support member and a cylindrical outer support member respectively fixed on a radially inner and a radially outer surface thereof, the inner and outer support members being fitted on the inner and first outer rigid members, respectively, at the other axial end of the upper support, the second elastic body being interposed between the inner and first outer rigid members for elastic connection therebetween, (e) the first and second elastic bodies at least partially defining an annular fluid chamber which extends between the inner and first outer rigid members in a circumferential direction of the upper support, the fluid chamber being filled with a non-compressible fluid, (f) a resonance member which is accommodated in the fluid chamber so as to substantially divide the chamber into two sections and to define a restricted fluid passage through which the non-compressible fluid flows between the two sections, upon application of vibrations to the upper support, and (g) a second outer rigid member fixedly fitted on the first outer rigid member, the second outer member including an attaching portion for connection with the vehicle body.

The second object indicated above may be achieved according to another aspect of the present invention, which provides a method of manufacturing the upper support described above, comprising the steps of: (a) preparing a first intermediate product including the inner rigid member, the first outer rigid member and the first elastic body interposed between the inner rigid member and the first outer rigid member at the one of axially opposite ends of the upper support, such that the inner rigid member and the first outer rigid member are elastically connected by the first elastic body; (b) preparing the second elastic body having the cylindrical inner and outer support members respectively fixed on the radially inner and outer surfaces thereof; (c) preparing a second intermediate product by disposing the resonance block in between the inner and first outer rigid members of the first intermediate product, placing the first intermediate product and the resonance member within a mass of the non-compressible fluid, fitting the inner and outer support members of the second elastic body on the inner and first outer rigid members, respectively, at the other axial end thereof, so as to elastically connect the inner and first outer rigid members by the second elastic body, and thereby defining the fluid chamber between the first and second elastic bodies such that the fluid chamber is filled with the non-compressible fluid; (d) removing the second intermediate product out of the mass of the non-compressible fluid; and (e) fitting the second outer rigid member on the outer surface of the first outer rigid member, the second outer rigid member having the attaching portion such that the second outer rigid member is attachable to the vehicle body.

According to the upper support of the present invention described above, the second outer rigid member having the attaching portion can be easily circumferentially positioned relative to the inner rigid member, under the atmosphere, after the first outer rigid member and the other members are assembled together within a mass of the non-compressible fluid. That is, the assembling, within the mass of the non-compressible fluid, of the first outer rigid member and the inner rigid member so as to fill the fluid chamber does not require the circumferential positioning of the first outer rigid member relative to the inner rigid member. Thus, the assembling of the instant upper support is simplified, and the assembling efficiency is significantly increased, even where the second outer rigid member is relatively large-sized.

Further, according to the method of manufacturing the upper support of the present invention, the assembling of the resonance member and second elastic body to the first intermediate product within the fluid mass can be automated, since these members are not required to be circumferentially positioned relative to each other.

BRIEF DESCRIPTION OF THE DRAWINGS

The above and optional objects, features and advantages of the present invention will be better understood by reading the following description of presently preferred embodiments of the invention, when considered in conjunction with the accompanying drawings, in which.

DETAILED DESCRIPTION OF THE PREFERRED EMBODIMENT

Figure 1:
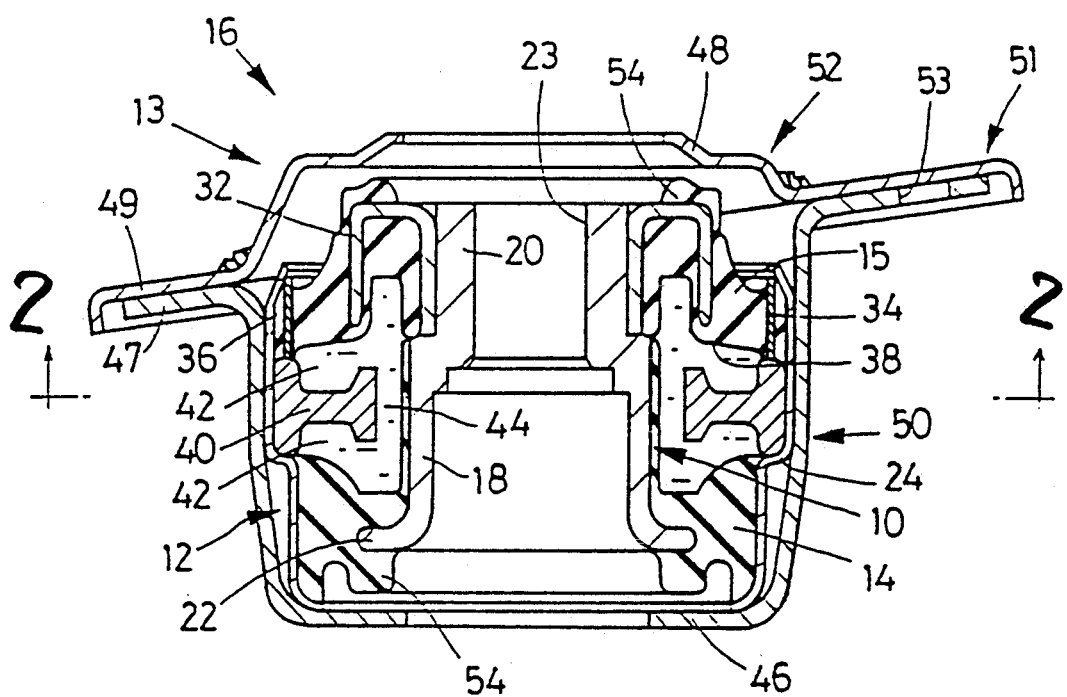
FIG. 1 is an elevational view in axial cross section of one embodiment of the present invention, in the form of an upper support used for a suspension system of a motor vehicle.
Figure 2:
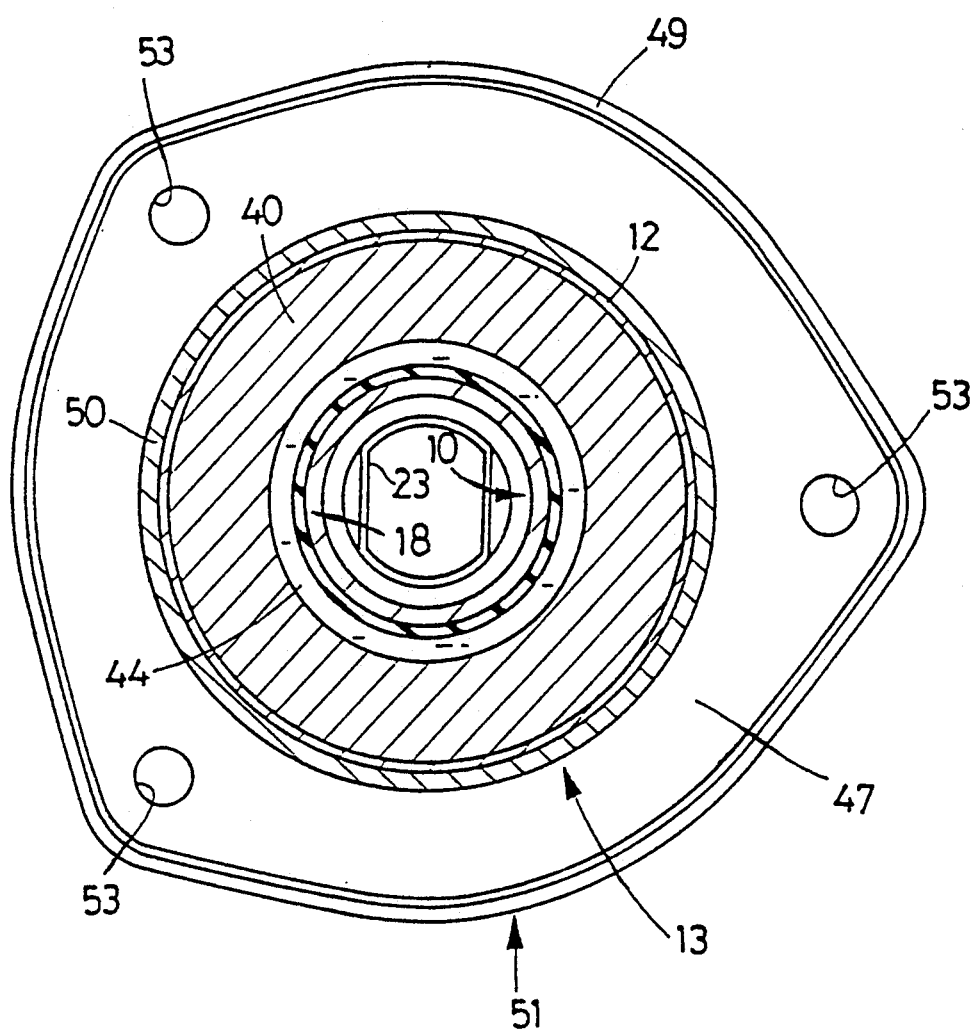
FIG. 2 is a transverse cross sectional view taken along line 2—2 of FIG. 1.

Referring first to FIGS. 1 and 2, there is illustrated a generally cylindrical upper support used for a suspension system of a motor vehicle, which is constructed according to the present invention. In these figures, reference numeral 10 denotes a generally cylindrical inner rigid member in the form of an inner metal sleeve, while reference numeral 12 denotes a generally cylindrical first outer rigid member in the form of an outer metal sleeve which is disposed radially outwardly of the inner metal sleeve 10. Between the inner and outer sleeves 10, 12, there are interposed a first and a second elastic body 14, 15 made of a suitable rubber material, for elastically connecting the inner and outer metal sleeves 10, 12. On the outer surface of the outer metal sleeve 12, there is fitted a generally cylindrical second outer rigid member in the form of an outer metal bracket 13 consisting of an upper and a lower cylindrical member 50, 52 (which will be described later). In the instant embodiment, the inner metal sleeve 10 is fixed to a shock absorber (not shown) of the suspension system, while the outer metal bracket 13 is fixed to a body (not shown) of the vehicle.

More specifically described, the inner metal sleeve 10 is a thick-walled generally cylindrical member consisting of a large-diameter portion 18, a small-diameter portion 20 having a smaller diameter than the portion 18, and a shoulder portion formed axially intermediate of the sleeve 10, for connecting these portions 18, 20. The large-diameter portion 18 has an annular protrusion 22 extending radially outwardly from one axial end portion remote from the small-diameter portion 20. As shown in FIG. 2, the small-diameter portion 20 has a center bore 23 which is defined by a pair of parallel flat surfaces opposed to each other in a diametric direction of the sleeve 10 and a pair of opposed arcuate surfaces connecting the flat surfaces. A piston rod (not shown) of the shock absorber is inserted through the center bore 23, such that the piston rod cannot be rotated relative to the inner metal sleeve 10.

The outer metal sleeve 12 is a generally cylindrical thin-walled member having an axially intermediate stepped portion 24. The outer metal sleeve 12 is disposed substantially coaxially with and radially outwardly of the inner metal sleeve 10, with a suitable radial spacing therebetween, such that a small-diameter portion of the outer sleeve 12 is opposed to the large-diameter portion 18 of the inner sleeve 10 in the radial direction.

Figure 3:
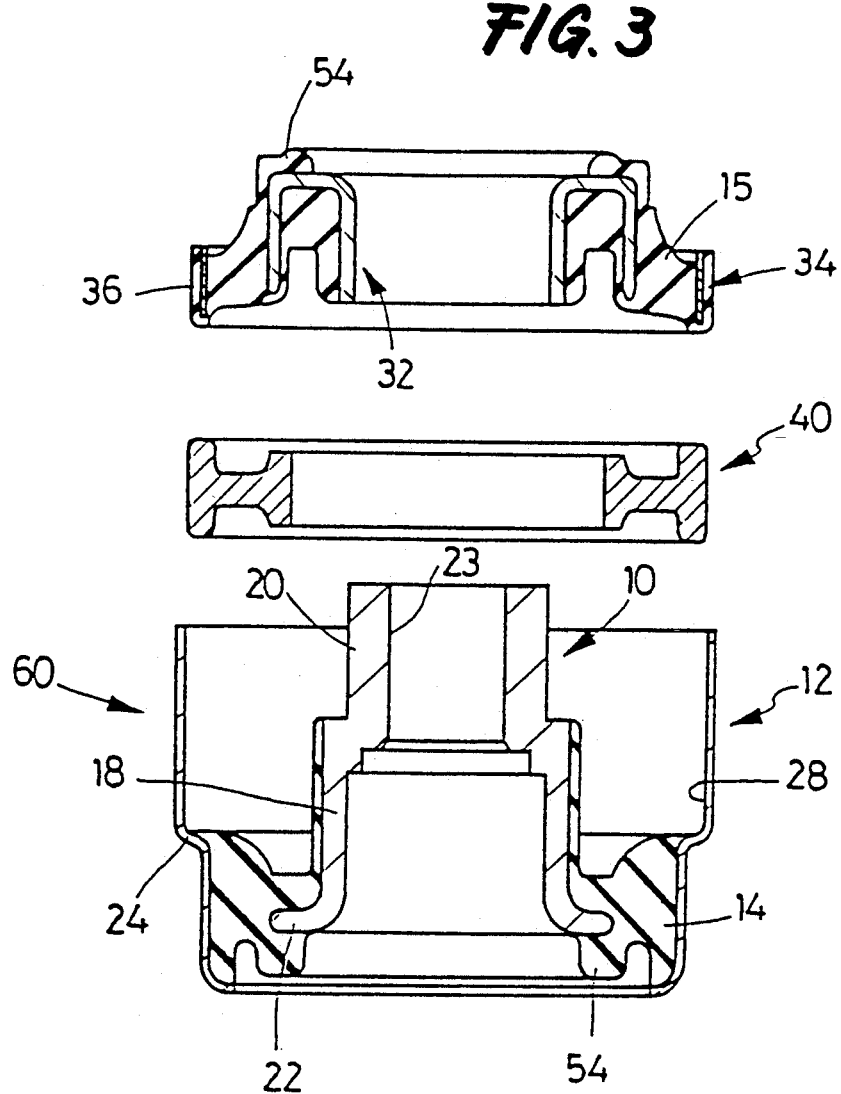
FIGS. 3, 4, 5, and 6 are axial cross sectional views of the intermediate products of the upper support of FIG. 1, which is manufactured according to one embodiment of the method of the present invention.

Between the large-diameter portion 18 of the inner metal sleeve 10 and the small-diameter portion of the outer metal sleeve 12, there is disposed the first elastic body 14 having an annular shape, for elastically connecting these sleeves 10, 12. The first elastic body 14 is positioned in one axial end portion or the lower portion of the upper support 16. Between the inner and outer sleeves 10, 12, therefore, there is formed an annular space 28 (as shown in FIG. 3), which is open in the other axial end portion or the upper portion of the support 16.

The second elastic body 15 is disposed on the side of the small-diameter portion 20 of the inner metal sleeve 10. The inner and outer circumferential surfaces of the second elastic body 15 are respectively secured by vulcanization to an inner and an outer support member 32, 34, each having a generally cylindrical shape. The second elastic body 15 is interposed between the inner metal sleeve 10 and the outer metal sleeve 12 such that the inner support member 32 is fitted on the outer circumferential surface of the small-diameter portion 20 of the inner metal sleeve 10, while the outer support member 34 is fitted on the inner circumferential surface of a large-diameter portion of the outer metal sleeve 12, and the axial end portion of the outer sleeve 12 is caulked against the outer support member 34 in the axial direction of the support 16. The outer surface of the outer support member 34 is covered with a sealing rubber layer 36 so as to ensure fluid tightness at the interface between the members 34, 12.

With the second elastic body 15 interposed between the inner metal sleeve 10 and the outer metal sleeve 12, the opening of the annular space 28 is fluid-tightly closed, and an annular enclosed space is defined between the first and second elastic bodies 14, 15. This annular enclosed space extends over the entire circumference of the elastic bodies 14, 15 and is filled with a suitable non-compressible fluid to thereby provide an annular fluid chamber 38. The non-compressible fluid may be selected from among water, alkylene glycol, polyalkylene glycol, silicone oil, or a mixture thereof.

Within the fluid chamber 38, an annular resonance member 40 is accommodated such that the resonance member 40 is interposed between the first and second elastic bodies 14, 15. The resonance member 40 has an inside diameter which is larger by a predetermined value than the outside diameter of the large-diameter portion 18 of the inner metal sleeve 10, and substantially the same outside diameter as the inside diameter of the large-diameter portion of the outer metal sleeve 12. This resonance member 40 is fixedly supported by the outer metal sleeve 12 such that a radially outer portion of the resonance member 40 is axially gripped by and between the stepped portion 24 of the sleeve 12 and the outer support member 34 secured to the second elastic body 15. Thus, the resonance member 40 is located at an axially intermediate portion of the fluid chamber 38.

In this arrangement, the fluid chamber 38 is substantially divided by the annular resonance member 40 into two sections 42, 42 located on the axially opposite sides of the resonance member 40. These two sections 42, 42 are held in fluid communication with each other, through an annular restricted fluid passage 44 which is defined by and between the inner circumferential surface of the resonance member 40 and the inner surface of the fluid chamber 38. The restricted fluid passage 44 allows the fluid to flow therethrough between the two sections 42, 42 of the fluid chamber 38, upon application of a vibrational load to the upper support. In the instant embodiment, the axial length, cross sectional and other dimensions of the restricted fluid passage 44 are determined so that the upper support 16 can provide a sufficiently lowered dynamic spring constant, based on resonance of the fluid flowing through the restricted fluid passage 44, when the upper support 16 receives a high-frequency vibration and noise, such as a road-oriented noise, during running of the vehicle.

As shown in FIGS. 1 and 2, the outer metal bracket 13 as the second outer rigid member is fitted on and firmly secured to the outer circumferential surface of the outer metal sleeve 12 (first outer rigid member). The outer metal bracket 13 consists of the lower cylindrical member 50 and the upper cylindrical member 52. The lower cylindrical member 50 has an inward flange 46 formed at one axial open end thereof and an outward flange 47 formed at the other axial open end thereof, while the upper cylindrical member 52 has an inward flange 48 formed at an axially inner open end thereof and an outward flange 49 formed at an axially outer open end thereof. The lower cylindrical member 50 is fitted on and attached to the outer metal sleeve 12. The outward flange 47 of the lower cylindrical member 50 and the outward flange 49 of the upper cylindrical member 52 are superposed on each other, such that the outward flanges 47, 49 are spot-welded to each other. Thus, the outer metal bracket 13 is assembled with the outer metal sleeve 12 such that the lower cylindrical member 50 substantially covers the outer metal sleeve 12.

In the thus constructed upper support, the inward flanges 46, 48 of the lower and upper cylindrical members 52, 50 are disposed such that the flanges 46, 48 axially face the annular protrusion 22 of the inner metal sleeve 10 and the inner support member 32, respectively, with suitable axial distances therebetween. In this arrangement, the amount of the axial movement of the inner metal sleeve 10 with respect to the outer metal sleeve and bracket 12, 13 is limited by abutting contact between the inward flanges 46, 48, and the annular protrusion 22 and the inner support member 32. On the axial end faces of the annular protrusion 22 and the inner support member 32 which axially face the inward flanges 46, 48, there are provided shock-absorbing rubber layers 54, 54 each having a suitable thickness.

With the outward flanges 49, 47 of the upper and lower cylindrical members 52, 50 superposed on each other, the outer metal bracket 13 is provided with an annular attaching portion 51 which extends radially outwardly of the cylindrical members 52, 50. In the instant upper support, the attaching portion 51 has three mounting holes 53 formed therethrough, which are substantially equally spaced apart from each other in the circumferential direction of the upper support 16, as shown in FIG. 2. The attaching portion 51 is secured to the vehicle body, by means of mounting bolts which extend through the holes 53 so as to be screwed into nuts secured to the vehicle body. Thus, the upper support 16 is secured to the vehicle body with the outer metal bracket 13 circumferentially positioned relative to the vehicle body.

In the thus constructed upper support 16, upon application of vibrations and noises in the axial direction (the vertical direction as viewed in FIG. 1) between the inner metal sleeve 10 and the outer metal bracket 13, the fluid flows between the two sections 42, 42 through the restricted fluid passage 44. Consequently, the upper support 16 exhibits a significantly lowered dynamic spring constant with respect to the high-frequency vibrations, such as road-oriented noises, based on the resonance of the fluid flowing through the restricted fluid passage 44.

Referring next to FIGS. 3 through 6, there will be described in detail an exemplary method of manufacturing the fluid-filled upper support 16 constructed as described above.

Initially, as shown in FIG. 3, the inner metal sleeve 10 and the outer metal sleeve 12 are disposed substantially coaxially with each other within a cavity of a suitably prepared mold. Then, a selected rubber material is poured into the cavity and vulcanized in a manner well known in the art, whereby the first elastic body 14 is formed between the inner and outer sleeves 10, 12 in the cavity. Thus, the inner metal sleeve 10, the outer metal sleeve 12, and the first elastic body 14 cooperate to constitute a first intermediate product 60 which has the annular space 28.

In the meantime, there are prepared the resonance member 40, and the second elastic body 15, in a process separate from the above-indicated process of forming the first intermediate product 60. The second elastic body 15 is secured by vulcanization at its inner surface to the inner support member 32 and at its outer surface to the outer support member 34.

Figure 4:
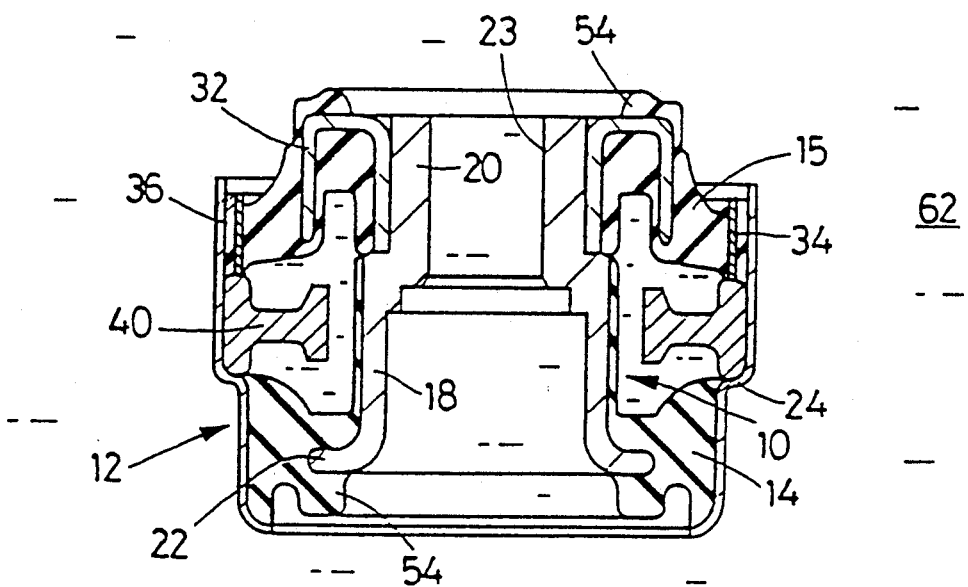

As illustrated in FIG. 4, the first intermediate product 60 is then submerged in a mass of the selected non-compressible fluid 62 for the fluid chamber 38, so that the non-compressible fluid 62 is admitted into the annular space 28. With the first intermediate product 60 held within the mass of the fluid 62, the resonance member 40 is inserted into the annular space 28 such that the radially outer portion of the resonance member 40 is in contact with the stepped portion 24 of the outer metal sleeve 12. Then, the second elastic body 15 is inserted into the annular space 28 such that the inner support member 32 is press-fitted on the small-diameter portion 20 of the inner metal sleeve 10, while the outer support member 34 is disposed on the axial end face of the radially outer portion of the resonance member 40. Thus, the second elastic body 15 is accommodated in the annular space 28.

Figure 5:
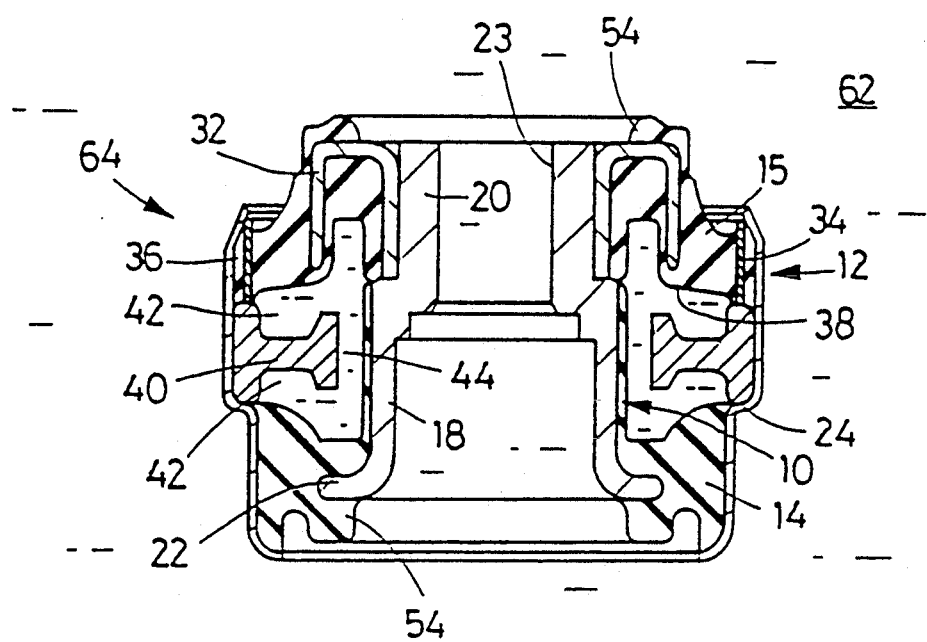

Within the fluid mass, the large-diameter portion of the outer metal sleeve 12 is subjected as needed to a radially inward drawing operation using eight dies, for example. Then, the large-diameter portion of the outer metal sleeve 12 is caulked at its open end against the outer support member 34, so that the outer sleeve 12 is fixedly attached to the outer support member 34 secured to the outer surface of the second elastic body 15. Thus, the axial open end of the annular space 28 is fluid-tightly closed by the second elastic body 15, so as to provide the fluid chamber 38 filled with the selected non-compressible fluid 62, as shown in FIG. 5. The radially outer portion of the resonance member 40 is axially gripped and supported by and between the stepped portion 24 of the outer metal sleeve 12 and the outer support member 34, whereby the resonance member 40 is fixedly supported by the outer metal sleeve 12. With the first intermediate product 60 assembled with the resonance member 40 and the second elastic body 15 in the fluid mass 62, there is provided a second intermediate product 64 wherein the fluid chamber 38 has the two sections 42, 42 communicating with each other through the restricted fluid passage 44.

Figure 6:
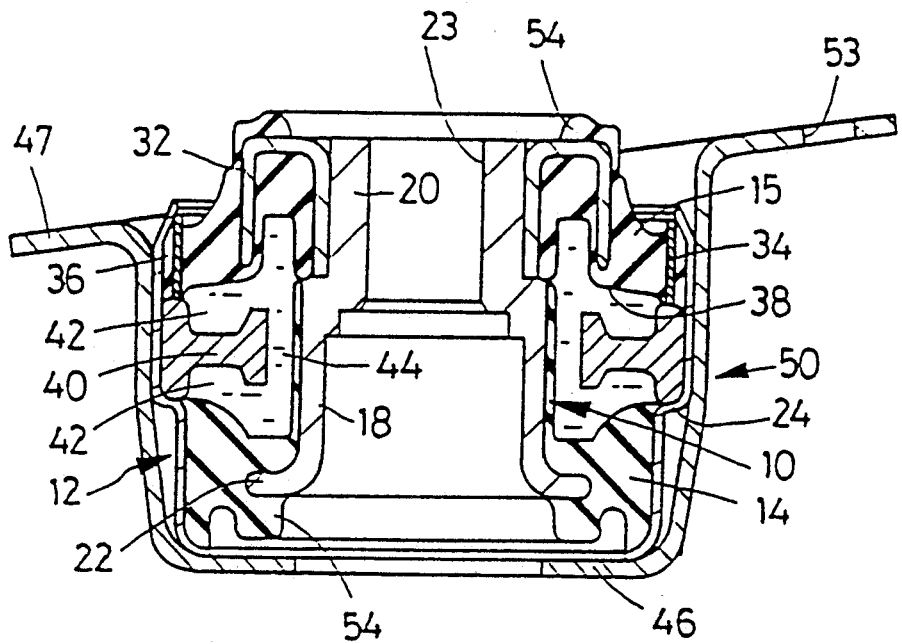

The thus obtained second intermediate product 64 is removed out of the fluid mass 62, and then assembled under the atmosphere with the outer metal bracket 13 having the attaching portion 51, such that the outer bracket 13 is fixedly fitted on the intermediate product 64. More specifically, the lower cylindrical member 50 is press-fitted on the outer metal sleeve 12, as shown in FIG. 6, such that the inward flange 46 of the lower member 50 is located on the side of the first elastic body 14 secured to the small-diameter portion of the outer sleeve 12. Then, the upper cylindrical member 52 is disposed on the upper open end of the lower member 50, as illustrated in FIG. 1, and the superposed outward flanges 47, 49 of the members 50, 52 are fixed to each other by a suitable spot-welding operation, for example. As a result, the outer metal bracket 13 is fixedly attached to the outer metal sleeve 12, to thereby obtain an upper support 16 of the present invention. Upon assembling of the upper support 16, the lower cylindrical member 50 is press-fitted on the second intermediate product 64, so that the outer metal bracket 13 having the attaching portion is properly oriented in the circumferential direction of the upper support 16, with respect to the inner metal sleeve 10 having the above-indicated center bore 23.

According to the instant method as described above, therefore, the formation of the fluid chamber 38 and the filling of the fluid chamber 38 with the fluid can be accomplished by mounting the second elastic body 15 between the inner and outer sleeves 10, 12 of the first intermediate product 60 within the fluid mass 62. Accordingly, the mounting of the outer metal bracket 13 having the attaching portion 51 on the second intermediate product 64 is favorably effected under the atmosphere.

Thus, the instant method does not require a large-sized metallic member like the outer metal bracket 13 to be mounted on the intermediate product 64 within the fluid mass 62. In addition, the fluid is prevented from adhering to the outer metal bracket 13 or intruding into the inside of the metal bracket 13 during assembling of the metal bracket 13 and the second intermediate product 64, thereby eliminating cumbersome procedures such as washing or wiping off the fluid from the metal bracket 13 or discharging the fluid out of the metal bracket 13 after the assembling process. Thus, the instant upper support 16 can be manufactured in a sufficiently simplified manner with significantly improved efficiency.

According to the above method of manufacturing the upper support 16, the mounting of the outer metal bracket 13 on the second intermediate product 64 is readily effected under the atmosphere, so that the metal bracket 13 with the attaching portion 51 is properly positioned or oriented with respect to the inner sleeve 10, in the circumferential direction of the upper support 16. This also leads to a further enhanced efficiency in manufacturing the instant upper support 16.

Further, according to the instant manufacturing method, the outer metal sleeve 12, resonance member 40 and second elastic body 15 which are mounted on the first intermediate product 60 in the fluid mass 62 can be easily positioned relative to the inner sleeve 10, without the circumferential orientation thereof with respect to the center bore 23 of the inner sleeve 10. Accordingly, the assembling of the second intermediate product 64 in the fluid mass 62, that is, the filling of the fluid chamber 38 with the fluid 62, is considerably simplified, and is therefore easily automated.

While the present invention has been described in detail in its presently preferred embodiment, it is to be understood that the invention is not limited to the details of the illustrated embodiment.

For example, the construction of the resonance member which is accommodated in the fluid chamber to define the restricted fluid passage is not limited to that of the illustrated embodiment. The resonance member may be supported by the inner metal sleeve so as to protrude radially outwards from the inner sleeve toward the outer sleeve.

It is to be noted that the manner of connecting the inner and outer metal sleeves to the shock absorber and vehicle body, respectively, is not limited to the above-indicated manner, and may be changed as needed, depending upon the construction of the vehicle on which the upper support is mounted.

It is also to be noted that the resonance member may be mounted on the first intermediate product under the atmosphere.

It is to be understood that the present invention may be embodied with various other changes, modifications and improvements, which may occur to those skilled in the art, without departing from the spirit and scope of the invention defined in the following claims.

What is claimed is:

1. An upper support for a suspension system, which is interposed between a body of a vehicle and a shock absorber of the vehicle for elastically connecting the vehicle body and the shock absorber, comprising:

a generally cylindrical inner rigid member having a center bore for receiving a piston rod of a shock absorber;

a generally cylindrical first outer rigid member which is disposed radially outwardly of said inner rigid member with a predetermined radial spacing therebetween;

an annular first elastic body which is interposed between said inner and first outer rigid members at one of axially opposite ends of the upper support, for elastically connecting said inner and first outer rigid members;

an annular second elastic body having a cylindrical inner support member and a cylindrical outer support member respectively fixed on a radially inner and a radially outer surface thereof, said inner and outer support members being fitted on said inner and first outer rigid members, respectively, at the other axial end of the upper support, said second elastic body being interposed between said inner and first outer rigid members for elastic connection therebetween;

said first and second elastic bodies at least partially defining an annular fluid chamber which extends between said inner and first outer rigid members in a circumferential direction of the upper support, said fluid chamber being filled with a non-compressible fluid;

a resonance member positioned in said fluid chamber so as to substantially divide said chamber into two sections and to define a restricted fluid passage through which said non-compressible fluid flows between said two sections, upon application of vibrations to the upper support; and a second outer rigid member fixedly fitted on said first outer rigid member such that the entirety of said first outer rigid member is axially aligned with and disposed radially inwardly of a portion of said second outer rigid member, said second outer rigid member including an attaching portion for connection with the vehicle body.

2. An upper support according to claim 1, wherein said inner rigid member has an axial portion having said center bore, said axial portion having a pair of parallel flat surfaces for engagement with said piston rod, said parallel flat surfaces being opposed to each other in a diametric direction of said inner rigid member and partially defining said center bore.

3. An upper support according to claim 2, wherein said axial portion of said center bore of said inner rigid member further has a pair of arcuate surfaces which connect said pair of parallel flat surfaces and cooperate with said parallel flat surfaces to define said center bore.

4. An upper support according to claim 1, wherein said attaching portion of said second outer rigid member has a plurality of mounting holes for attachment of said second outer rigid member to the vehicle body, said mounting holes being spaced from each other in a circumferential direction of said second outer rigid member.

5. An upper support according to claim 4, wherein said second outer rigid member has a generally cylindrical portion, said attaching portion extending radially outwardly from said generally cylindrical portion.

6. An upper support according to claim 5, wherein said second outer rigid member comprises two generally cylindrical members having respective outward flanges which are superposed on each other so as to provide said attaching portion.

7. An upper support according to claim 1, wherein said first outer rigid member has a stepped portion, and said resonance member is held in abutting contact with said stepped portion, at a radially outer portion thereof.

8. An upper support according to claim 7, wherein said radially outer portion of said resonance member is gripped by said stepped portion of said first outer rigid member and said cylindrical outer support member of said annular second elastic body.

9. An upper support according to claim 1, further comprising a sealing rubber layer through which said cylindrical outer support member is fitted on an inner circumferential surface of said first outer rigid member.

* * * * *